Feb. 27, 1945.  D. W. TURNER  2,370,210
LIQUID-FLOW INDICATING AND METERING SYSTEM
Filed July 26, 1943
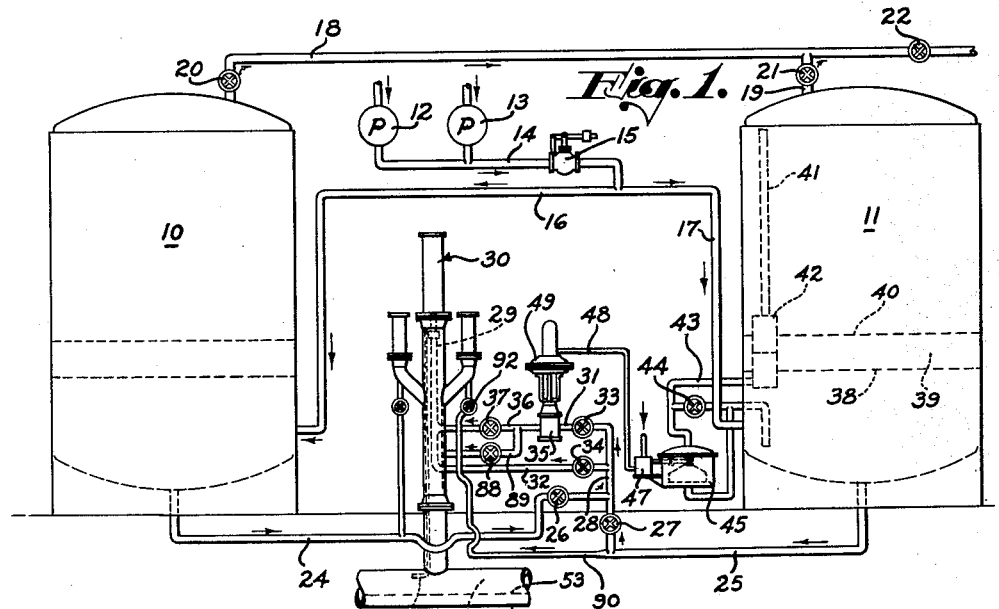
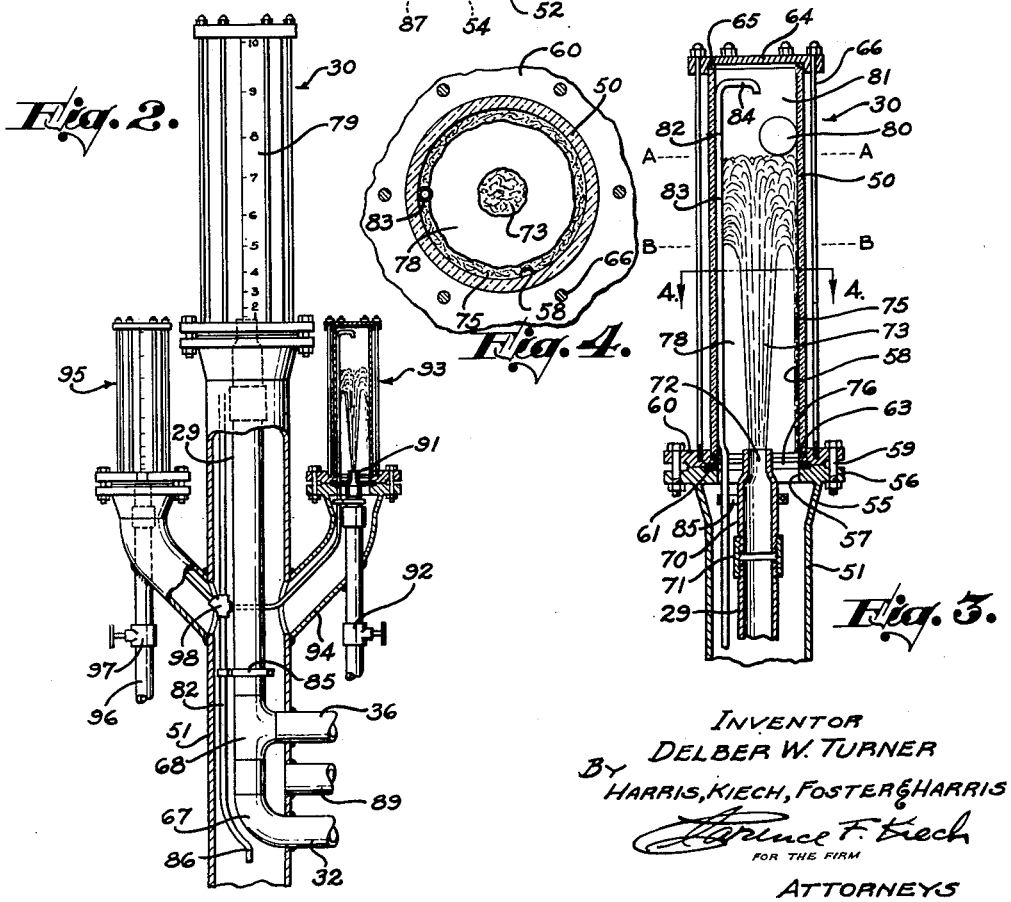
INVENTOR
DELBER W. TURNER
BY HARRIS, KIECH, FOSTER & HARRIS
Clarence F. Kiech
FOR THE FIRM
ATTORNEYS Patented Feb. 27, 1945

2,370,210

UNITED STATES PATENT OFFICE 2,370,210

LIQUID-FLOW INDICATING AND METERING SYSTEM

Delber W. Turner, Houston, Tex., assignor to Petrolite Corporation, Ltd., Wilmington, Del., a corporation of Delaware Application July 26, 1943, Serial No. 496,149

15 Claims. (Cl. 73—195)

My invention relates to a novel apparatus for measuring the flow of liquids and/or observation of the characteristic of a flowing liquid. More particularly, the invention is concerned with the metering and visual observation of bleed liquids withdrawn from processing tanks. The device finds utility in a refinery or other restricted area when it is important to visually inspect the material being bled from the separating tank and at the same time prevent the dispersion of gas into the atmosphere.

In many arts, bleed liquids of a variable character or composition are withdrawn from a processing tank and it is often desirable to determine the rate of withdrawal thereof or the character or composition thereof. For example, in the processing of mineral oils, it is often desirable to mix the oil with a liquid sufficiently immiscible therewith to separate later therefrom and to effect such separation in a tank, either with or without treatment facilitating such separation. The added liquid may comprise a chemical treating agent or may be water or other liquid capable of mixing with and separating from oil, and the mixing may be performed either inside or outside the separating tank. The liquids are separately bled from the tank and it is often desirable to be able to measure and/or inspect one or both effluents. The invention will be particularly described with reference to determination of the amount and character of an effluent water from the bottom of such a tank.

Such a bleed water or other effluent liquid may vary as to amount or character, or both. Changes in amount of the bleed liquid may arise from changes in the rate of delivery of liquid to the processing tank, changes in the rate of withdrawal of the bleed liquid therefrom, changes in some process variable, etc. Changes in character of the bleed may arise from a change in incoming materials, change in conditions within the processing tank, inadequate separation of liquid phases therein, etc. I choose particularly to exemplify the invention with reference to the separation of oil-water systems in which the water bleed from the processing tank may be contaminated with oil to change its clarity. In such a system, the present invention can be employed most advantageously, both for measuring the quantity of bleed liquid discharging and for observing the character thereof so that appropriate changes may be made in the processing.

It is an object of the present invention to provide a novel apparatus for determination of flow or character of the liquid stream, typically a stream of liquid bled from a processing tank.

It is another object of the invention to discharge the bleed liquid as a fountain, the height of the fountain varying with the quantity of the bleed liquid and the character of the bleed liquid being determined during flow along a transparent surface.

Another object of the invention is to discharge the bleed water upward in a sight tube and to design the device so that the fountain includes an upwardly-rising column which spreads into contact with the internal surface of the sight tube, the bleed water flowing downward by gravity along this internal surface. Still another object is to discharge the column axially upward in the sight tube so that the liquid at the upper end of the column spreads radially and flows down the internal surface of the sight tube as a peripheral stream, thus spreading the liquid into a relatively thin film facilitating observation of the character thereof.

Another object of the invention is to provide the sight tube at the upper end of a drain pipe into which the bleed liquid drains, while yet another object is to design the fountain so that the rising column of the bleed liquid is separated from the downwardly-moving stream thereof to provide an annular gas space in open communication with the interior of the drain pipe. In this latter connection, it is desirable that the drain pipe be of such size as not to be completely filled by the discharging liquid.

Another object of the invention is to provide communication between the space above the liquid fountain and the drain pipe or the annular gas space, either for purpose of equalizing pressures or for transferring liberated gases.

Another object of the invention is to provide for composite and individual determinations of amount and character of bleed liquids withdrawn from a plurality of processing tanks. In this connection, the invention provides a primary device for testing the composite flow representing the bleeds from two or more treaters and one or more auxiliary devices for testing the individual flows from the processing tanks.

Other objects and advantages of the invention will be evident to those skilled in the art from the following description of an exemplary installation.

Referring to the drawing:

Figure 1 shows diagrammatically the bleed-testing system of the invention as applied to two processing tanks;

Figure 2 is an enlarged view, partially in vertical section, of the bleed-testing equipment of Figure 1 showing more in detail the arrangement of the primary and auxiliary testing devices;

Figure 3 is an enlarged sectional view of the primary bleed-testing device of Figure 2; and Figure 4 is a horizontal sectional view, taken on the line 4—4 of Figure 3.

Referring particularly to Figure 1, processing tanks 10 and 11 are shown as being of the pressure type and as being employed in a system for the purification of oils. As diagrammatically shown, proportioned streams of oil and water are pumped by pumps 12 and 13, from suitable sources not shown, into a pipe 14 including a weight-loaded mixing valve 15 which can be adjusted to form a dispersion of the liquids. This dispersion may be either a mixture or an emulsion and is of such character as to betreated or separated to produce a water bleed and an oil bleed from each of the processing tanks 10 and 11. The dispersion formed by the mixing valve 15 is split into two streams flowing respectively through pipes 16 and 17 to the processing tanks 10 and 11. In each processing tank, the dispersion is caused to separate into an oily material rising to the top of the tank and constituting the oil bleed therefrom, and an aqueous material dropping to the bottom of the tank and constituting the water bleed therefrom.

The oil bleed is continuously withdrawn from the upper end of the processing tanks through pipes 18 and 19 provided with control valves 20 and 21, the two oil bleeds being manifolded to pass through a control valve 22 which, if desired, may be of the constant-pressure type to maintain considerable superatmospheric pressure in the tanks 10 and 11 under the influence of the pumps 12 and 13. The water bleed is withdrawn from the bottom of each tank by use of the invention, as will be described.

It will be understood that various expedients can be employed to aid in the separation of the oily material and the aqueous material or that the oil and water can be mixed in such manner that the action of gravity alone may suffice to give the desired separation in the tanks 10 and 11. In other instances, separation of the dispersion, be it a mere mixture or an emulsion, can be aided by the employment of chemicals added either to the incoming piping or to the tanks themselves, by the employment of heat and pressure in the tanks, or by the employment of electric fields, agitation, etc., within the tanks 10 and 11.

The water bleeds from tanks 10 and 11 flow, respectively, through individual pipes 24 and 25 provided with valves 26 and 27, and discharge into a manifold pipe 28. From here, the composite bleed flows to a conduit 29 of a primary testing device 30 to produce a fountain therein, as will be hereinafter described. The composite bleed may flow to the conduit 29 through either a control pipe 31 or a by-pass pipe 32, or both, as controlled by the setting of valves 33 and 34, respectively, in these pipes. The control pipe 31 includes a main control valve 35 and the composite bleed discharging therefrom flows to the conduit 29 through a pipe 36 equipped with a valve 37.

The liquids in the tanks 10 and 11 sometimes separate at a rather definite interface, such, for example, as indicated by the dotted line 38, or separation may take place to form an upper body of oily material and a lower body of aqueous material separated by an interfacial zone 39, shown as bounded by dotted lines 38 and 40. It is often desirable that the interfacial level or the interfacial zone should be maintained in substantially constant vertical position in each of the tanks 10 and 11 and, for this purpose, the main control valve 35 is made to open to a greater extent when the interfacial level or zone rises and close to a greater extent when the interfacial level or zone lowers. The preferred interconnection is of the type described in the patent to Waterman, No. 2,309,228, to which reference is made for a more complete disclosure as to the interconnecting means shown diagrammatically in Figure 1.

As shown, this interconnecting means includes an internal pipe 41 open at its upper and lower ends to communicate respectively with the bodies of oily and aqueous material in the tank 11. This pipe is enlarged in the vicinity of the interfacial zone, as indicated by the numeral 42, and contains columns of oily material and aqueous material separating at a rather definite interface, as shown. A portion 43 of the pipe 41 loops outward to a position exterior of the tank and contains a normally-closed valve 44. A differential pressure device 45, suitably a bell-type manometer, is connected to the looped portion on opposite sides of the valve 44 and is responsive to the change in the interfacial level within the enlarged portion 42. This differential-pressure device 45 is mechanically or otherwise connected to a pneumatic valve 47 controlling the supply of air through a pipe 48 to a control mechanism 49 for the main control valve 35. The action is such as to control the water bleed so as to maintain the interfacial zone 39 substantially constant in vertical position. In this connection, it is necessary only to control the valve 35 in response to changes in one of the processing tanks. This is particularly true if the tanks are at the same elevation and if they receive divided streams from the mixing valve 15 and if the processing conditions therein are substantially uniform.

It will be understood, however, that the amount of bleed water withdrawn from either or both of the processing tanks may vary somewhat, and it is one purpose of the primary testing device 30 to indicate such variations in the quantity of composite bleed water withdrawn from a plurality of processing tanks.

The primary testing device 30 is best shown in Figures 1, 2, and 3. In general, it includes an upright tubular means comprising a sight tube 50 and a drain pipe 51 extending downward to a sewer 52. This sewer is shown as being of the subterranean type and of sufficient size as to be only partially filled by the liquid discharging therealong, the liquid level being indicated by the dotted line 53, and a gas space 54 being provided above the liquid stream. By employment of the word "sewer" in this description, I have reference to private or municipal sewage lines or merely to disposal pipes for conducting liquid to a point of storage or disposal.

The lower end of the drain pipe 51 communicates with the gas space 54 of the sewer 52. As best shown in Figure 3, the upper end of this drain pipe is flared at 55 and carries a plate 56 having a central opening 57 which is of substantially the same size as the internal surface 58 of the sight tube 50. Detachably connected to the plate 56 by bolts 59 is a flange 60 carrying the sight tube 50. The plate 56 and flange 60 are suitably recessed to receive a gasket 61.

The flange 60 produces an upper annular recess receiving the lower end of the sight tube 50 and carrying a gasket 63 to provide an effective seal therebetween. At least a portion of this sight tube 50 is made of transparent material and the preferred construction employs a glass cylinder as the sight tube. The uppermost end of the sight tube is closed by a head 64 grooved to receive the upper end of this tube and a gasket 65. The head 64 is drawn toward the flange 60 to clamp the sight tube therebetween, this being accomplished by a plurality of rods 66 turning in the head 64 and threaded into the flange 60.

The conduit 29, receiving the composite bleed, extends vertically upward within the drain pipe 51. It communicates with the by-pass pipe 32 through an elbow 67 and provides a T-fitting 68 communicating with the control pipe 36. At the upper end of the conduit 29 is disposed a suitable nozzle means, shown as comprising a restricted nozzle 70 detachably connected to the conduit 29 by a coupling 71. This nozzle provides a discharge orifice 72 of somewhat smaller size than the conduit 29 so as to throttle the flow and produce a pressure drop across the nozzle.

At the same time, the nozzle 70 is designed to establish a fountain within the sight tube 50 of a character best shown in Figure 3. This fountain comprises an upwardly-moving column 73 of bleed liquid which spreads into contact with the internal surface 58 at its upper end in a zone between the levels A—A and B—B, and then flows downward immediately inside and in contact with the internal surface 58 as a thin peripheral stream or film 75 which discharges by gravity into the outer zone of the drain pipe 51 from the open lower end of the sight tube 50. In this connection, the nozzle 70 is substantially smaller than the sight tube and its mounting structure to provide an annular discharge passage 76. This passage is shown as being bounded on one side by the outer periphery of the nozzle 70 and on the other side by the internal surface 58 of the sight tube 50 and the aligned surfaces of the gaskets 61 and 63 and the flange 60 and plate 56. The annular discharge passage 76 should be of such size as not to be completely filled by the peripheral stream. Rather, this peripheral stream discharges downward in the extreme outer portion of the annular discharge passage 76 and drops or flows along the flared portion 55 to resume its downward movement as a peripheral stream within the drain pipe 51 in contact with the internal surface thereof. This permits the inner portion of the annular discharge passage 76 and the inner portion of the annular space between the conduit 29 and the drain pipe 51 to form a gas-filled space opening on the gas space 54 of the sewer 52.

It is also a feature of the preferred embodiment of the invention that the upwardly-moving column 73 and the downwardly-moving peripheral stream 75 of the fountain should be separated from each other below the level B—B to form an annnular gas space 78. If the drain pipe 51 discharges to a sewer, this gas space 78 is then in open communication with the gas space 54 of the sewer.

The design of the nozzle 70 to effect the desired spreading in the zone between the levels A—A and B—B is not critical. In some instances, the desired type of fountain can be formed even if the jetted column 73 does not substantially diverge until reaching the spreading zone between the levels A—A and B—B. Usually, however, some small divergence of the column 73 is preferred. In the absence of the sight tube 50, the stream would spread between the levels A—A and B—B to a diameter greater than that of the internal surface 58, and the liquid would fall somewhat irregularly around the column 73. With the sight tube 50 in place, the liquid spreads radially into contact therewith and flows downward and uniformly along the internal surface 58, with substantially no tendency to leave this surface, particularly in view of the surface tension of the liquid, the water-wet or water-wettable character of the internal surface, and the vertical disposition of this surface.

The height to which the fountain rises in the sight tube 50 is dependent upon the amount of liquid discharging upward through the nozzle 70. The uppermost portion of the fountain, represented by the level A—A, is a slightly turbulent surface, the position of which can be read from a calibrated scale 79 adjacent the sight tube 50, the indicia of this scale being marked either on the outer surface of the sight tube or on an element extending longitudinally thereof. The scale 79 may be calibrated in terms of gallons per minute, barrels per day, or any other desired units. In the fountain-type unit described, such a scale will not be linear but will be of the square-root type. In effect, the height of the fountain varies with the pressure drop across the nozzle 70 and a square-root-type scale, with calibrations substantially proportional to those indicated in Figure 2, can be employed to give the desired indication of the amount of bleed.

The character of the bleed can be determined by visual inspection of the peripheral stream 75. In this connection, it is desirable to make the sight tube 50 entirely of transparent material so that it may be viewed from any side by light transmitted from the opposite side. The sight tube 50 is desirably positioned at an elevation facilitating such inspection of the bleed liquid without undue stooping of the inspector. If desired, the transmitted light may be increased by a supplementary light source, such as an incandescent lamp positioned on one side of the sight tube or within the annular gas space 78.

If the character of the bleed is such as to produce surface deposits along the internal surface 58 following prolonged use, it is often desirable to place an object such as a ball 80 in the sight tube to be raised by the fountain and to float or ride on top thereof with attendant oscillation due to the somewhat turbulent nature of the top surface of the fountain. Such a ball may be made of any suitable material, such as synthetic rubber, plastic material, or metal. The spreading nature of the fountain between the levels A—A and B—B carries such a ball outward so that it vibrates and rolls in contact with the internal surface 58 to keep this surface clean to facilitate inspection of the height of the fountain. Further, the ball will shift to different peripheral portions of the sight tube during operation to maintain a clean annular zone for inspection of the fountain height.

With this type of fountain, a gas space 81 is present between the top of the fountaain and the head 64. The spreading portion of the fountain between the levels A—A and B—B forms, in effect, a seal between the gas space 81 and the annular gas space 78. In some instances, operation of the device may tend to reduce the pressure in the annular gas space 78 and increase the pressure in the gas space 81, the latter being due primarily to the liberation of gases from the bleed, particularly if there is a substantial drop in pressure across the orifice 72. In other instances, such, for example, when there is little or no gas liberation and a condition exists in which the annular space between the conduit 29 and the drain pipe 51 becomes filled by the downwardly-moving stream, a slight vacuum may exist in the gas space 81. It is desirable that the pressures in these two gas spaces 78 and 81 be substantially equal and, also, that each pressure be substantially equal to the substantially constant pressure in the zone, for example, the sewer 52, into which the drain pipe discharges. It is also desirable to withdraw any liberated gases, which may sometimes be explosive, to prevent discharge into, and accumulation in, the atmosphere surrounding the device.

To effect the desired pressure equalization and to prevent any danger from accumulation of such gases, a vent means 82 is provided. As best shown in Figures 2 and 3, this vent means may include a small vertical tube 83 with its upper end 84 bent so that the open end faces downwardly in the gas space 81. This tube 83 extends downward immediately inside the sight tube 50 and may be secured by brackets 85 to the nozzle 70 and the conduit 29. The lowermost end of this tube 83 should be open to the pressure in the gas space 78. In Figure 2, this open lower end is indicated by the numeral 86 and is bent inward to face downward immediately below the elbow 67 so as to be out of the flow of bleed liquid moving downward in the drain pipe 51. In some instances, it is desirable, as suggested in Figure 1, to extend this pipe to the gas space 54 of the sewer 52, in which event the open lower end is bent sidewise in the extreme upper end of the space 54, as indicated by the dotted line 87.

Referring particularly to Figure 1, the system can be operated so that all of the composite bleed liquid flows through the control pipe 31 by opening the valve 33 and closing the valve 34. Alternatively, each of these valves may be partially open so that a portion of the stream flows continuously through the control pipe 31, and the by-pass pipe 32 to combine in the conduit 29. Further, all or a portion of the liquid moving through the control pipe 31 may be by-passed to the drain pipe 51 by adjusting the valve 37 and opening a valve 88 in a by-pass line 89, this portion of the bleed liquid being thus by-passed from the fountain.

In most multi-tank installations, it is desirable also to be able to inspect the bleeds of the individual tanks. In this way, observation of the composite bleed may give an indication of trouble and the operator may then inspect the individual bleeds to determine which tank is responsible for the difficulty.

Figures 1 and 2 show a preferred arrangement for inspecting the individual bleeds. Referring thereto, a pipe 90 communicates with the pipe 25 and discharges bleed liquid from the tank 11 upwardly through a nozzle 91 under the control of a valve 92. This nozzle is part of an auxiliary testing device 93 for the tank 11, this device being smaller but otherwise substantially identical with the primary testing device 30, previously described. Preferably, the auxiliary testing device 93 includes an angled drain pipe 94 welded to, and communicating with the outer interior of, the drain pipe 51 for disposal of the bleed liquid from the fountain. Depending upon the setting of valves 27 and 92, the bleed liquid from the tank 11 may be passed partially or wholly through the auxiliary testing device 93 for determination of character and also for determination of amount or changes in amount of the bleed liquid. It is often desirable to maintain at all times a fractional flow of the bleed liquid from the tank 11 to the auxiliary testing device 93 but, in other instances, this device can normally be rendered inoperative by closing the valve 92 and can be brought into operation, when it is desired to inspect the individual bleed from the connected tank, by opening valve 92 and partially or completely closing the valve 27.

A similar auxiliary testing device 95 is associated with the tank 10 to receive all or a portion of the bleed liquid from the pipe 24 through a pipe 96 under control of a valve 97. Each of the auxiliary testing devices 93 and 95 is preferably provided with vent means of the type previously described, and the lower ends thereof can communicate with the interior of the tube 83 by disposing a fitting 98 in this tube, as suggested in Figure 2. Additional auxiliary testing devices can be disposed around the drain pipe 51 corresponding in number to the interconnected tanks.

Various changes and modifications can be made without departing from the spirit of the invention as defined in the appended claims.

I claim as my invention:

1. In a device for indicating the amount and character of a liquid stream, the combination of: an upright tubular means comprising a drain pipe and a sight tube at the upper end thereof, said sight tube providing a chamber communicating with said drain pipe and being formed at least in part of transparent material; nozzle means for jetting a column of liquid axially upward in said tubular means to form a fountain in said chamber of said sight tube, the height of said fountain varying with the amount of liquid discharged from said nozzle means, said nozzle means being smaller than said tubular means to jet said stream upward as a column of substantially smaller size in horizontal cross section than said tubular means, the upwardly-jetted stream spreading outward into contact with said sight tube adjacent the upper end of the fountain to flow by gravity as a peripheral stream downward along and in contact with the interior of said sight tube into said drain pipe, the upwardly-jetted stream of liquid being also smaller than said peripheral stream to provide an annular gas space therebetween closed at its upper end by the spreading liquid, said sight tube providing an upper gas space above the fountain, said upper gas space being separated from said annular gas space by the spreading liquid of the fountain; and pressure-equalizing means comprising an open-ended tube communicating at its upper end with said upper gas space and at its lower end with said annular gas space.

2. In a device for indicating the amount and character of a liquid stream, the combination of: a drain pipe providing an upper end; an upright sight tube extending upward from said upper end and providing an internal surface bounding a chamber communicating with said drain pipe, said upright sight tube being formed at least in part of transparent material; discharge means for discharging said liquid upward within said sight tube as a liquid fountain, the maximum level to which said liquid rises in said fountain being observable through said transparent material and varying in vertical position with the amount of liquid issuing from said discharge means, said discharge means directing said liquid to impinge on the internal surface of said sight tube near said level to flow downward along this surface by gravity and to discharge into said drain pipe, said drain pipe being sufficiently large as not to be filled by the downwardly-moving liquid; means for closing the upper end of said sight tube to provide a gas space above said level of said fountain; and an open-ended vent tube communicating between said gas space and the interior of said drain pipe.

3. In a device for indicating the amount and character of a bleed liquid continuously bled from a processing tank, the combination of: a drain pipe providing an upper end; an upright sight tube extending upward from said upper end and providing a chamber communicating with said drain pipe, said sight tube being closed at its upper end, said upright sight tube being formed at least in part of transparent material; a nozzle means directed vertically upward along the axis of said sight tube; conduit means connected to said tank to withdraw bleed liquid therefrom, said conduit means communicating with said nozzle means and the pressure in said tank being sufficient to discharge a stream of bleed liquid upward from said nozzle means in said sight tube as a liquid fountain comprising an upwardly-moving column of said bleed liquid rising in said sight tube to a level above said nozzle means which varies in vertical position with the amount of bleed liquid withdrawn from said processing tank, said upwardly-moving column being substantially smaller in size than the internal surface of said sight tube and said column spreading at its upper end into contact with said internal surface to flow downward therealong as a peripheral stream, said column of bleed liquid moving upward from said nozzle in spaced relationship with said downwardly-moving peripheral stream to provide an annular gas space therebetween communicating with said drain pipe, said peripheral stream moving downward into the outer portion of said drain pipe, said drain pipe being of sufficient size as not to be filled by the downwardly-moving bleed liquid; and vent means communicating between said drain pipe and the space in said sight tube above said liquid fountain for equalizing the pressures therein.

4. In a device for indicating the amount and character of a liquid stream, the combination of: an upright tubular means comprising a drain pipe and a sight tube at the upper end thereof, said sight tube bounding a chamber and being formed at least in part of transparent material; nozzle means for jetting a column of liquid axially upward in said tubular means to form a fountain in said chamber of said sight tube, the height of said fountain varying with the amount of liquid discharged from said nozzle means, said nozzle means being smaller than said tubular means to jet said stream upward as a column of substantially smaller size in horizontal cross section than said tubular means, the upwardly-jetted stream spreading outward into contact with said sight tube adjacent the upper end of the fountain to flow by gravity as a peripheral stream downward along and in contact with the interior of said sight tube into said drain pipe, the upwardly-jetted stream of liquid being also smaller than said peripheral stream to provide an annular gas space therebetween closed at its upper end by the spreading liquid, said sight tube providing an upper gas space above the fountain, said upper gas space being separated from said annular gas space by the spreading liquid of the fountain; and scale means providing indicia disposed vertically along said sight tube for determination of the height to which said liquid rises in said fountain and thus the amount of said liquid discharging through said nozzle means.

5. In a device for indicating the amount and character of a liquid stream, the combination of: a drain pipe providing an upper end; an upright sight tube extending upward from said upper end and providing an internal surface founding a chamber communicating with said drain pipe, said upright sight tube being formed at least in part of transparent material; discharge means for discharging said liquid upward within said sight tube as a liquid fountain, the maximum level to which said liquid rises in said fountain being observable through said transparent material and varying in vertical position with the amount of liquid issuing from said discharge means, said discharge means directing said liquid to impinge on the internal surface of said sight tube near said level to flow downward along this surface by gravity and to discharge into said drain pipe; and scale means adjacent said sight tube and bearing indicia for determination of the height to which said fountain rises in said sight tube and thus the amount of said liquid issuing from said discharge means.

6. In a device for indicating the amount and character of a bleed liquid continuously bled from a processing tank, the combination of: an upright sight tube formed at least in part of transparent material and providing a lower open end and an internal surface; a nozzle means directed vertically upward along the axis of said sight tube, said nozzle means being considerably smaller in horizontal cross-sectional area than said sight tube to provide an annular discharge passage at said open lower end; conduit means connected to said tank to withdraw bleed liquid therefrom, said conduit means communicating with said nozzle means, said nozzle means discharging said bleed liquid upward in said sight tube as a liquid fountain comprising an upwardly-moving column of said bleed liquid rising to a level above said nozzle means which level varies in vertical position with the amount of bleed liquid withdrawn from said processing tank, said upwardly-moving column being substantially smaller in size than the internal surface of said sight tube and said column spreading at its upper end adjacent said transparent material to contact said internal surface of said sight tube and flowing downward therealong and through the outer portion of said annular discharge passage as a peripheral stream surrounding but spaced from said nozzle means and said column of bleed liquid issuing therefrom to provide an annular gas space; and scale means adjacent said sight tube and bearing indicia for determination of the height to which said fountain rises in said sight tube to indicate the amount of bleed liquid continuously bled from said tank.

7. In a device for indicating the amount and character of a bleed liquid continuously bled from a processing tank, the combination of: means for continuously supplying to said processing tank under superatmospheric pressure a liquid stream comprising said bleed liquid; a conduit communicating with said tank for withdrawal of a stream of said bleed liquid therefrom; a nozzle means at the end of said conduit and directed upwardly to jet a column of said bleed liquid upward as a liquid fountain to a level above said nozzle means which level varies in vertical position with the amount of bleed liquid withdrawn from said processing tank, there being a spreading zone just below said level in which said bleed liquid spreads outward preparatory to dropping by gravity; an upright sight tube encompassing said fountain and providing an internal surface of such size adjacent said zone as to be contacted by the spreading liquid in said zone, said liquid flowing downward as a peripheral stream inside and in contact with the internal surface of said sight tube, said nozzle means and the column of bleed liquid at the point of discharge therefrom being substantially smaller in horizontal cross-sectional area than said peripheral stream to provide an annular gas space within said peripheral stream around said column and said nozzle means, said gas space extending from said nozzle means substantially to the lower boundary of said zone, at least a portion of said sight tube being formed of transparent material for observation of the height to which said fountain rises and for observation of said peripheral stream as it flows downward along said internal surface of said sight tube; and a calibrated scale means adjacent said sight tube and against which said height of said fountain can be compared as an indication of the rate of flow of said bleed liquid from said processing tank.

8. In a device for indicating the amount and character of a liquid stream, the combination of: an upright tubular means comprising a drain pipe and a sight tube at the upper end thereof, said sight tube providing a chamber communicating with said drain pipe and being formed at least in part of transparent material; nozzle means for jetting a column of liquid axially upward in said tubular means to form a fountain in said chamber of said sight tube, the height of said fountain varying with the amount of liquid discharged from said nozzle means, said nozzle means being smaller than said tubular means to jet said stream upward as a column of substantially smaller size in horizontal cross section than said tubular means, the upwardly-jetted stream spreading outward into contact with said sight tube adjacent the upper end of the fountain to flow by gravity as a peripheral stream downward along and in contact with the interior of said sight tube into said drain pipe, said sight tube providing an upper gas space above the fountain; and a ball supported by said fountain and free to move in said upper gas space to be forced outward by the outwardly-spreading stream to engage the internal surface of said sight tube to maintain same clean.

9. In a device for indicating the amount and character of a bleed liquid withdrawn from a processing tank, the combination of: an upright tubular means comprising a drain pipe and a sight tube at the upper end thereof; an upright conduit in said drain pipe and providing a nozzle means directed upwardly into said sight tube; and pipe means for withdrawing bleed liquid from said tank, said pipe means including a first pipe for discharging bleed liquid into said upright conduit, a second pipe for discharging bleed liquid into said drain pipe, and valve means for controlling the relative amounts of bleed liquid flowing through said first and second pipes, said bleed liquid flowing through said first pipe moving upwardly within said conduit and being jetted upwardly from said nozzle means to form a fountain within said sight tube, said fountain comprising an upwardly-moving column of said bleed liquid issuing from said nozzle means and spreading adjacent the upper end of said fountain into contact with the internal surface of said sight tube to flow downwardly as a stream along said internal surface and in contact therewith to discharge into said drain pipe, said upwardly-moving column being spaced from said downwardly-moving stream at a position below the zone in which said bleed liquid spreads into contact with said internal surface, said fountain rising to a height varying with the amount of bleed liquid discharging from said nozzle means, said sight tube being transparent from a position above said fountain to a position at which the character of the downwardly-moving stream can be observed.

10. In a device for indicating the amount and character of a bleed liquid withdrawn from a processing tank, the combination of: an upright tubular means comprising a drain pipe and a sight tube at the upper end thereof; an upright conduit in said drain pipe and providing a nozzle means directed upwardly into said sight tube; pipe means for withdrawing bleed liquid from said tank, said pipe means including a control pipe and a by-pass pipe, each discharging into said upright conduit, said bleed liquid moving upwardly within said conduit and being jetted upwardly from said nozzle means to form a fountain within said sight tube, said fountain comprising an upwardly-moving column of said bleed liquid issuing from said nozzle means and spreading adjacent the upper end of said fountain into contact with the internal surface of said sight tube to flow downwardly as a stream along said internal surface and in contact therewith to discharge into said drain pipe, said upwardly-moving column being spaced from said downwardly-moving stream at a position below the zone in which said bleed liquid spreads into contact with said internal surface, said fountain rising to a height varying with the amount of bleed liquid discharging from said nozzle means, said sight tube being transparent from a position above said fountain to a position at which the character of the downwardly-moving stream can be observed; a valve in said by-pass pipe; a control valve in said control pipe; and means for operating said control valve to maintain a substantially constant amount of bleed liquid in said tank.

11. In a device for testing the composite and individual bleeds from a plurality of processing tanks, the combination of: a drain pipe; a primary sight tube; a plurality of auxiliary sight tubes corresponding in number to said processing tanks; means for connecting all of said sight tubes to drain into said drain pipe; a nozzle directed upwardly in each of said sight tubes; means for manifolding the bleeds from a plurality of said tanks to form a composite bleed liquid and for delivering said composite bleed liquid to said nozzle of said primary sight tube to produce a fountain therein, the height of said fountain varying with the amount of composite bleed liquid discharging through this nozzle and the character of said composite bleed liquid being observable through said primary sight tube, said composite bleed liquid dropping from said primary sight tube into said drain pipe; a pipe means communicating with each of said plurality of processing tanks and with a nozzle of a corresponding auxiliary sight tube for discharging the bleed liquid from this tank into such corresponding one of said auxiliary sight tubes for individual observation of the character of this bleed liquid, the bleed liquid discharging into said auxiliary sight tubes draining into said drain pipe; and valve means for controlling the relative amounts of the bleed liquid flowing from each processing tank to said primary sight tube and to the auxiliary sight tube corresponding to such processing tank.

12. In a device for testing the composite and individual bleeds from a plurality of processing tanks, the combination of: a primary sight tube; a nozzle directed upwardly into said primary sight tube; a manifold pipe communicating with said nozzle; individual pipes for withdrawing bleed liquid from each of said tanks and communicating with said manifold pipe to produce a composite bleed liquid which is delivered to said nozzle, said nozzle being of smaller diameter than said primary sight tube to provide an annular discharge passage, said nozzle discharging said composite bleed liquid upwardly as a fountain in said primary sight tube, said composite liquid in said fountain spreading into contact with said sight tube and flowing downwardly therealong through said annular discharge passage, said primary sight tube being transparent to permit observation of the height of said fountain and the character of the composite bleed liquid flowing downwardly inside said sight tube; a plurality of auxiliary sight tubes corresponding in number to said tanks; an individual pipe communicating between each of said processing tanks and the interior of a corresponding auxiliary sight tube for discharge of bleed liquid from such tank into such corresponding sight tube; and valve means in each of said individual pipes for controlling the relative amounts of bleed liquid flowing from each tank to said primary sight tube and to the auxiliary sight tube corresponding to such processing tank.

13. In a device for testing the composite and individual bleeds from a plurality of processing tanks, the combination of: an upright drain pipe including an open upper end and a plurality of branch pipes corresponding in number to said tanks, each branch pipe providing an open upper end; a primary sight tube communicating with the upper end of said drain pipe; an auxiliary sight tube communicating with the upper end of each of said branch pipes, all of said sight tubes being formed at least in part of transparent material for observation of bleed liquid flowing therethrough; means for manifolding the liquid bleeds from each of said tanks to produce a composite bleed liquid; means for discharging said composite bleed liquid into said primary sight tube for observation of the composite bleed liquid; means for delivering bleed liquid from each of said tanks to a corresponding one of said auxiliary sight tubes for observation of the individual bleeds; and valve means controlling the relative amounts of bleed liquid flowing from each tank to said primary sight tube and to the auxiliary sight tube corresponding to this tank.

14. A combination as defined in claim 13, in which said delivering means and discharging means includes a nozzle directed axially upward in each of said primary and auxiliary sight tubes to discharge bleed liquid upwardly into same in a manner to produce a fountain, each fountain including an upwardly-moving column of bleed liquid discharging from the corresponding nozzle and spreading near the upper end of the fountain into contact with the internal surface of the sight tube to flow downwardly therealong as a peripheral stream, the peripheral stream from said primary sight tube discharging into said drain pipe and the peripheral streams from said auxiliary sight tubes discharging into said branch pipes and thence into said drain pipe.

15. A combination as defined in claim 13, in which said delivering means and discharging means includes a nozzle directed axially upward in each of said primary and auxiliary sight tubes to discharge bleed liquid upwardly into same in a manner to produce a fountain, each fountain including an upwardly-moving column of bleed liquid discharging from the corresponding nozzle and spreading near the upper end of the fountain into contact with the internal surface of the sight tube to flow downwardly therealong as a peripheral stream, the peripheral stream from said primary sight tube discharging into said drain pipe and the peripheral streams from said auxiliary sight tubes discharging into said branch pipes and thence into said drain pipe, and including a vent means communicating with said drain pipe and with each of said sight tubes at a position above the fountain of bleed liquid therein.

DELBER W. TURNER.